US012689925B2

(12) United States Patent (10) Patent No.: US 12,689,925 B2

Mehta et al. (45) Date of Patent: Jul. 21, 2026

(54) COVERAGE AND LOAD BASED SMART MOBILITY

(71) Applicant: Boost SubscriberCo L.L.C., Englewood, CO (US)

(72) Inventors: Dhaval Mehta, Aldie, VA (US); Siddhartha Chenumolu, Broadlands, VA (US)

(73) Assignee: BOOST SUBSCRIBERCO L.L.C., Englewood, CO (US)

( * ) Notice: Subject to any disclaimer, the term of this patent is extended or adjusted under 35 U.S.C. 154(b) by 635 days.

(21) Appl. No.: 17/888,288

(22) Filed: Aug. 15, 2022

(65) Prior Publication Data

US 2023/0397031 A1 Dec. 7, 2023

Related U.S. Application Data

(60) Provisional application No. 63/349,853, filed on Jun. 7, 2022.

(51) Int. Cl.
*H04W 24/10* (2009.01)
*H04W 16/14* (2009.01)
*H04W 88/06* (2009.01)

(52) U.S. Cl.
CPC ........... *H04W 24/10* (2013.01); *H04W 16/14* (2013.01); *H04W 88/06* (2013.01)

(58) Field of Classification Search
CPC ..... H04W 24/10; H04W 16/14; H04W 88/06; H04W 48/18
See application file for complete search history.

(56) References Cited

U.S. PATENT DOCUMENTS

2017/0111844 A1* 4/2017 Routt .................... H04W 40/12
2017/0373950 A1 12/2017 Szilagyi et al.
(Continued)

FOREIGN PATENT DOCUMENTS

WO WO-2023091664 A1 * 5/2023 ......... H04L 41/5025
WO WO-2023092664 A1 * 6/2023 ............. B08B 13/00

OTHER PUBLICATIONS

Machine Translation of WO 2023091664 A1 (Year: 2021).*
(Continued)

*Primary Examiner* — Khaled M Kassim
*Assistant Examiner* — Noah James Sugden
(74) *Attorney, Agent, or Firm* — Seed Intellectual Property Law Group LLP

(57) ABSTRACT

Disclosed is a method of operating a fifth-generation New Radio (5G NR) cellular telecommunication network radio access network (RAN). The method includes: receiving, by an intelligent sensor device, configuration information that identifies carrier frequencies; receiving, by the intelligent sensor device, a radio frequency signal at each of the carrier frequencies identified by the configuration information; generating, by the intelligent sensor device, digital signal information corresponding to the radio frequency signal received at each of the carrier frequencies identified by the configuration information; and transmitting, by the intelligent sensor device, the digital signal information to a sensor processing unit device. The sensor processing unit device determines a network load on each of the carrier frequencies identified by the configuration information based on the digital signal information. The sensor processing unit device transmits corresponding network load information to a processing device that makes user mobility determinations based on the network load information.

14 Claims, 15 Drawing Sheets

(56)                    References Cited

U.S. PATENT DOCUMENTS

| | | | |
|---|---|---|---|
| 2018/0287696 A1 * | 10/2018 | Barbieri ............... | H04W 36/08 |
| 2020/0267596 A1 * | 8/2020 | Sudarsan ............. | H04W 36/22 |
| 2021/0058110 A1 * | 2/2021 | Zhang ................... | H04B 1/582 |
| 2022/0078798 A1 * | 3/2022 | Kumar ............... | H04W 72/542 |

OTHER PUBLICATIONS

3GPP TS 38.331 V15.4.0, $3_{rd}$ Generation Partnership Project; Technical Specification Group Radio Access Network; Radio Resource Control (RRC) protocol specification (Release 15), Dec. 2018, 474 pages.
3rd Generation Partnership Project, "Add LBO use cases, requirements, and related information," 3GPP TSG-SA5 S5-211128, Change Request 28.313, Current Version 17.0.0, vol. SA WG5, Meeting #135e, Sophia Antipolis, France, Jan. 25-Feb. 3, 2021. (8 pages).
International Search Report and Written Opinion, mailed Sep. 22, 2023, for International Application No. PCT/US2023/024337. (20 pages).

* cited by examiner

*108*

Memory 604

SPU Module 606

Other Programs and Data 608

CPU
610

I/O Interfaces
612

Other Computer-
Readable Media
614

Network
Connections
616

*112*

Memory 804

RIC Module 806

Other Programs and Data 808

CPU
810

I/O Interfaces
812

Other Computer-
Readable Media
814

Network
Connections
816

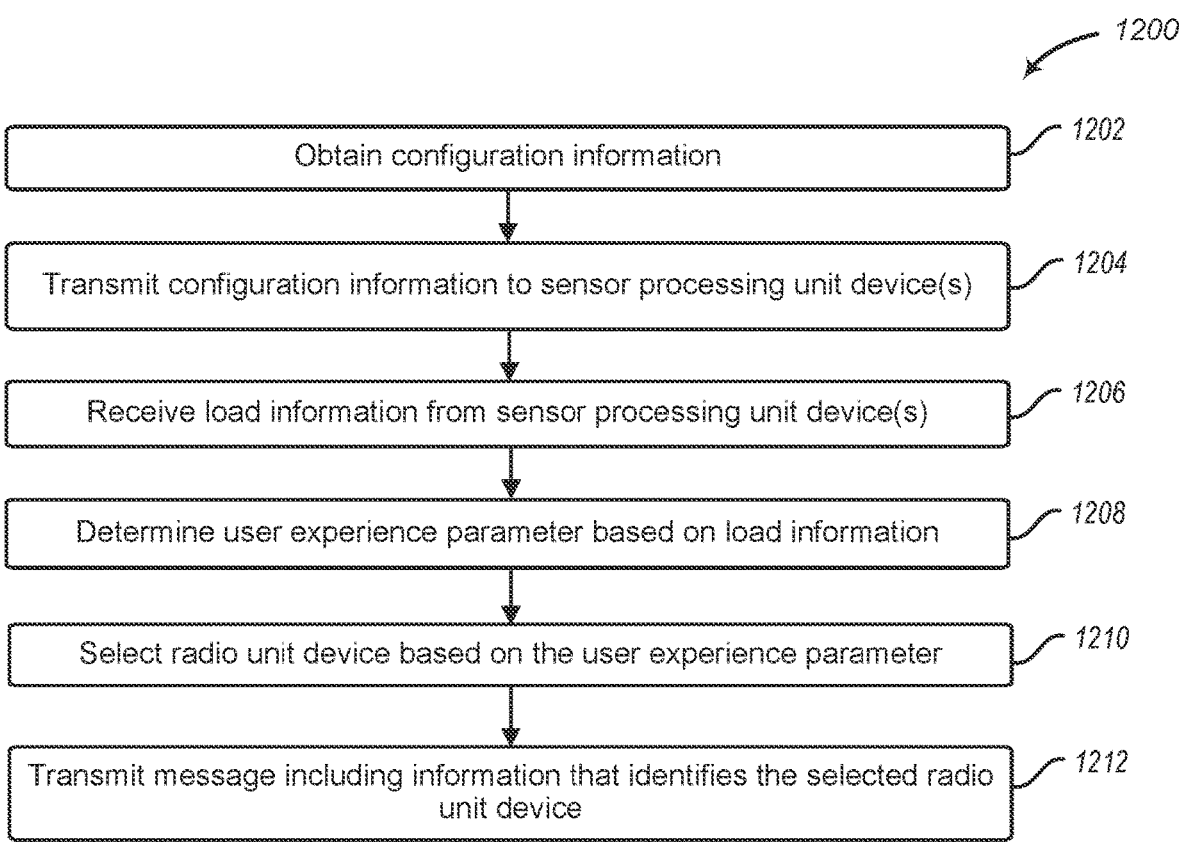

*1200*

*1202*   Obtain configuration information

*1204*   Transmit configuration information to sensor processing unit device(s)

*1206*   Receive load information from sensor processing unit device(s)

*1208*   Determine user experience parameter based on load information

*1210*   Select radio unit device based on the user experience parameter

*1212*   Transmit message including information that identifies the selected radio unit device

*FIG. 12*

COVERAGE AND LOAD BASED SMART MOBILITY

BACKGROUND

Description of the Related Art

Conventional wireless network may be designed to broadcast information using multiple carrier frequencies. Such wireless networks may also have overlapping coverage areas from multiple Mobile Network Operators (MNOs), which may have mutual agreements to allow users to roam across home and partner networks. Currently, Radio Access Network (RAN) systems do not share any loading information across different operator networks. Additionally, loading information may not be shared among different vendors within the same operator network. Thus, mobility within and across operator networks may be performed blind, which may not provide optimal user experiences.

BRIEF SUMMARY

According to the present disclosure, sensor processing unit devices can configure intelligent sensor devices to monitor one or more specified frequencies, which may be used by base station devices and user equipment devices in a vicinity of the sensor devices. Additionally, the sensor processing unit devices can configure the intelligent sensor devices to monitor one or more specified wireless communication technologies, such as, Long Term Evolution (LTE), New Radio (NR), and Wi-Fi communication technologies, for example. The sensor processing unit devices may be configured to connect to external entities, such as RAN, RAN Intelligent Controller (RIC), and Orchestrator entities, for example. Based on signal data received from the intelligent sensor devices, the corresponding sensor processing unit devices can detect loading on the one or more specified frequencies, and provide real-time updates to one or more external entities. External entities, such as RAN, MC, Orchestrator, entities, for example, may provide information that specifies particular frequencies and other parameters required for detection of various wireless communication technologies, which is used to configure the sensor processing unit devices and the intelligent sensor devices. The RAN and/or other network components can configure mobility of a User Equipment (UE) device (e.g., laptop computer, mobile telephone) based on the loading on the specified frequencies. In addition, the RAN and/or other network components can configure the sensor processing unit devices and the intelligent sensor devices to be slice aware, wherein each "slice" or portion of the network is allocated based on specific needs of applications, use cases, and/or customers.

A method of operating a fifth-generation New Radio (5G NR) cellular telecommunication network radio access network (RAN) according to the present disclosure may be summarized as including: receiving, by an intelligent sensor device, configuration information that identifies one or more carrier frequencies; receiving, by the intelligent sensor device, a radio frequency signal at each of the one or more carrier frequencies identified by the configuration information; generating, by the intelligent sensor device, digital signal information corresponding to the radio frequency signal received at each of the one or more carrier frequencies identified by the configuration information; and transmitting, by the intelligent sensor device, the digital signal information.

The receiving configuration information may include receiving the configuration information from a sensor processing unit device, and the transmitting the digital signal information may include transmitting the digital signal information to the sensor processing unit device.

The configuration information may identify a bandwidth associated with each of the one or more carrier frequencies, and the radio frequency signal received at each of the one or more carrier frequencies identified by the configuration information may have the bandwidth associated with each of the one or more carrier frequencies.

The intelligent sensor device may be operated by a first mobile network operator (MNO), and the one or more carrier frequencies identified by the configuration information may include at least one carrier frequency used by a second MNO that is different from the first MNO.

The intelligent sensor device may be operated by a first mobile network operator (MNO), and the one or more carrier frequencies identified by the configuration information may not be used by the first MNO.

A method of operating a fifth-generation New Radio (5G NR) cellular telecommunication network radio access network (RAN) according to the present disclosure may be summarized as including: receiving, by a sensor processing unit device, configuration information that identifies one or more carrier frequencies; transmitting, by the sensor processing unit device, the configuration information to an intelligent sensor device; receiving, by the sensor processing unit device, signal information transmitted by the intelligent sensor device, the signal information corresponding to one or more radio frequency signals received at the one or more carrier frequencies identified by the configuration information; determining, by the sensor processing unit device, a network load on each of the one or more carrier frequencies identified by the configuration information based on the signal information transmitted by the intelligent sensor device; and transmitting, by the sensor processing unit device, information indicating the network load on each of the one or more carrier frequencies identified by the configuration information.

The receiving configuration information may include receiving the configuration information from a RAN Intelligent Controller (MC) device, and the transmitting information indicating the network load may include transmitting the information indicating the network load to the MC device.

The receiving configuration information may include receiving the configuration information from a Centralized Unit (CU) device, and the transmitting information indicating the network load may include transmitting the information indicating the network load to the CU device.

The method may further include decoding, by the sensor processing unit device, at least one signal using the signal information transmitted by the intelligent sensor device.

The configuration information may identify one or more wireless communication technologies, and the method may further include: decoding, by the sensor processing unit device, at least one signal using the signal information transmitted by the intelligent sensor device; converting, by the sensor processing unit device, a result of the decoding into a waveform corresponding to one of the one or more wireless communication technologies; and decoding, by the sensor processing unit device, the waveform corresponding to one of the one or more wireless communication technologies, and the determining the network load may include determining the network load based on a result of the decoding the waveform corresponding to one of the one or more wireless communication technologies.

The one of the one or more wireless communication technologies may be a Long Term Evolution (LTE) wireless communication technology, a 5G NR wireless communication technology, or a Wi-Fi wireless communication technology.

The sensor processing unit device may be operated by a first mobile network operator (MNO), and the one or more carrier frequencies identified by the configuration information may include at least one carrier frequency used by a second MNO that is different from the first MNO.

The sensor processing unit device may be operated by a first mobile network operator (MNO), and the one or more carrier frequencies identified by the configuration information may not be used by the first MNO.

A method of operating a fifth-generation New Radio (5G NR) cellular telecommunication network radio access network (RAN) according to the present disclosure may be summarized as including: transmitting, by a processing device, configuration information that identifies one or more carrier frequencies to a sensor processing unit device; receiving, by the processing device, information indicating a network load on each of the one or more carrier frequencies identified by the configuration information from the sensor processing unit device; determining, by the processing device, at least one user experience parameter based on the information indicating the network load on each of the one or more carrier frequencies identified by the configuration information; selecting, by the processing device, a radio unit device based on the at least one user experience parameter; and transmitting, by the sensor processing unit device, a message including information that may identify the radio unit device.

The processing device may be a RAN Intelligent Controller (MC) device.

The processing device may be a Centralized Unit (CU) device.

The method message may be configured to cause a handover of a User Equipment (EU) device to the radio unit device.

The configuration information may include information that identifies one or more wireless communication technologies. The one or more wireless communication technologies may include a Long Term Evolution (LTE) wireless communication technology, a 5G NR wireless communication technology, or a Wi-Fi wireless communication technology.

The processing device may be operated by a first mobile network operator (MNO), and the one or more carrier frequencies identified by the configuration information may include at least one carrier frequency used by a second MNO that is different from the first MNO.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings.

FIG. 12 illustrates a logical flow diagram showing an example of a method of operating a RIC device in accordance with embodiments described herein.

DETAILED DESCRIPTION

5G Networks typically include a Core Network (Core) and a Radio Access Network (RAN), which provides network services to end user devices such as smartphones and sensors. Also, 5G Networks typically include a Centralized Unit (CU) device that may be implemented in a cloud computing environment by virtual servers that communicate with computing devices located at a local data center (LDC) that are configured as Distributed Unit (DU) devices, each of which provides network services to a group of associated Radio Unit (RU) devices located at a cell site.

In general, while a User Equipment (UE) device is stationary, the UE device is associated with and has network services provided by a first RU device of a first base station in a vicinity of the current location of the UE device. If the UE device moves from its current location to a new location, a handover is performed which results in the UE device becoming associated with and having network services provided by a second RU device of a second base station in a vicinity of the new location of the UE device. Messages and procedures for performing such a handover are described in 3rd Generation Partnership Project; Technical Specification Group Radio Access Network; NR; Radio Resource Control (RRC) protocol specification (Release 15) ("3GPP TS 38.331 V15.4.0"), which is incorporated by reference in its entirety herein.

Figure 1:
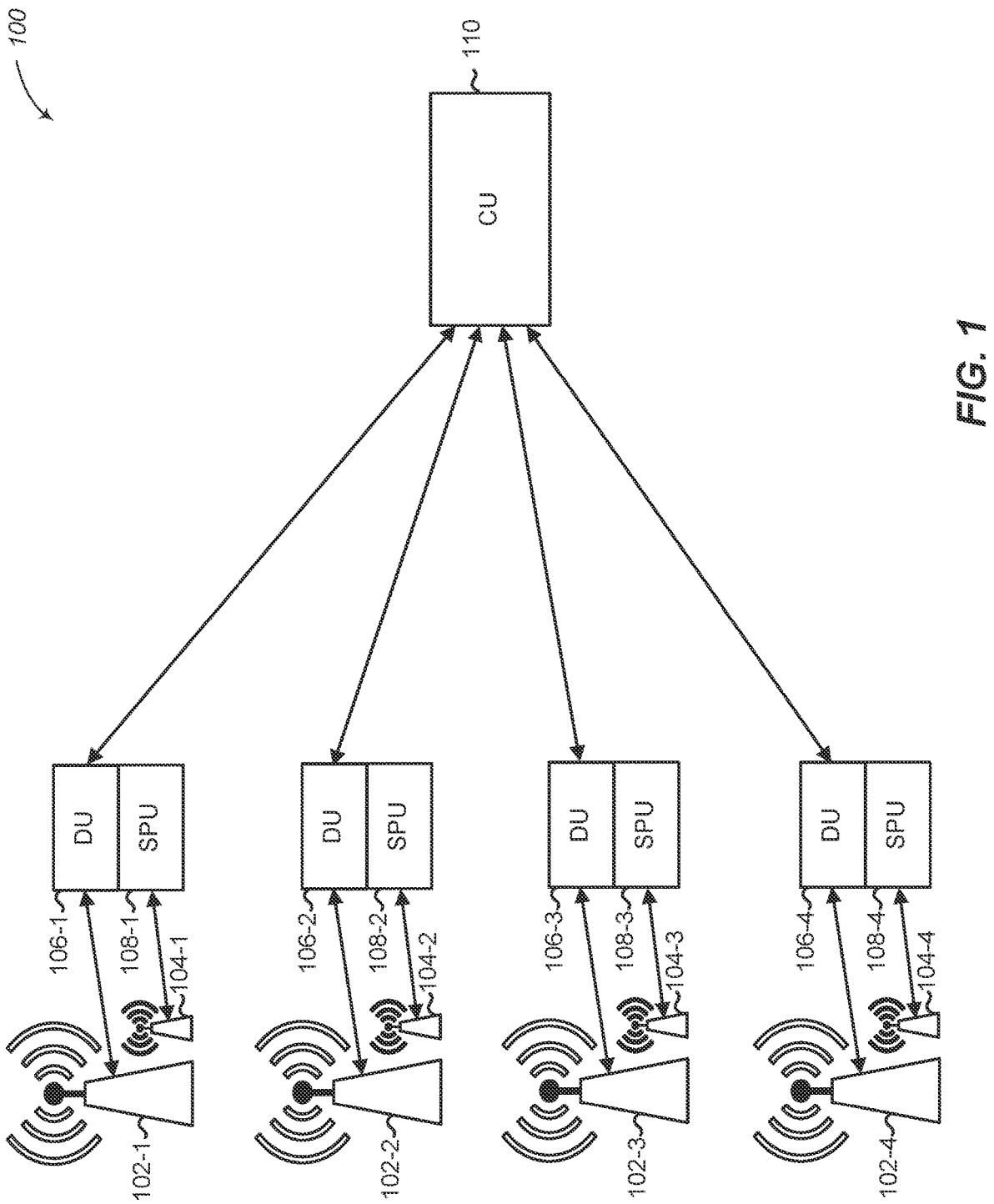
FIG. 1 is a block diagram illustrating a system in accordance with embodiments described herein.

FIG. 1 is a block diagram illustrating a system 100 in accordance with embodiments described herein. The system 100 includes a plurality of Radio Unit (RU) devices 102-1, 102-2, 102-3, and 102-4. In one or more implementations, each of the Radio Unit (RU) devices 102-1, 102-2, 102-3, and 102-4 is located at a different cell site and is part of a 5G base station that uses New Radio (NR) wireless communication technology, which is referred to as a gNodeB (gNb).

The system 100 also includes a plurality of intelligent sensor devices 104-1, 104-2, 104-3, and 104-4. In one or more implementations, each of the intelligent sensor devices 104-1, 104-2, 104-3, and 104-4 is collocated with a corresponding one of the Radio Unit (RU) devices 102-1, 102-2, 102-3, and 102-4. In one or more implementations, each of the intelligent sensor devices 104-1, 104-2, 104-3, and 104-4 is not collocated with a corresponding one of the RU devices 102-1, 102-2, 102-3, and 102-4.

Additionally, the system 100 includes a plurality of Distributed Unit (DU) devices 106-1, 106-2, 106-3, and 106-4. Each of the Distributed Unit (DU) devices 106-1, 106-2, 106-3, and 106-4 communicates with and controls operation of a corresponding one of the Radio Unit (RU) devices 102-1, 102-2, 102-3, and 102-4.

Also, the system 100 includes a plurality of sensor processing unit devices 108-1, 108-2, 108-3, and 108-4. Each of the sensor processing unit devices 108-1, 108-2, 108-3, and 108-4 controls operation of a corresponding one of the intelligent sensor devices 104-1, 104-2, 104-3, and 104-4. In one or more implementations, each of the sensor processing unit devices 108-1, 108-2, 108-3, and 108-4 is collocated with a corresponding one of the Distributed Unit (DU) devices 106-1, 106-2, 106-3, and 106-4. In one or more implementations, each of the sensor processing unit devices 108-1, 108-2, 108-3, and 108-4 is integrated within the corresponding one of the Distributed Unit (DU) devices 106-1, 106-2, 106-3, and 106-4.

The sensor processing unit devices 108-1, 108-2, 108-3, and 108-4 perform a variety of functions. For example, each of the sensor processing unit devices 108-1, 108-2, 108-3, and 108-4 performs a sensor connection endpoint function, which causes the sensor processing unit device to manage communications between the sensor processing unit device and the corresponding intelligent sensor device in order to configure frequencies, bands, and/or wireless communication technologies that are to be scanned by the intelligent sensor device. Each of the sensor processing unit devices 108-1, 108-2, 108-3, and 108-4 may also perform a received signal to wireless communication technology convertor function, which causes the sensor processing unit device to decode received signals and convert the received signals to a desired wireless communication technology format or waveform. Examples of such wireless communication technologies include Long Term Evolution (LTE) technology, 5G New Radio (NR) technology, and Wi-Fi technology, but are not limited thereto. Additionally, each of the sensor processing unit devices 108-1, 108-2, 108-3, and 108-4 may perform a received signal to wireless communication technology processor function, which causes the sensor processing unit device to decode a desired wireless communication technology from a received signal. In addition, each of the sensor processing unit devices 108-1, 108-2, 108-3, and 108-4 may perform a per wireless communication technology load determination function, which causes the sensor processing unit device to determine or estimate a load on each configured carrier frequency per configured wireless communication technology. Further, each of the sensor processing unit devices 108-1, 108-2, 108-3, and 108-4 may perform an external end-point manager function, which causes the sensor processing unit device to communicate with an external system, such as a RAN device, a RIC device, or an orchestrator device, for example.

The system 100 also includes a Centralized Unit (CU) device 110 that communicates with and controls operation of each of the Distributed Unit (DU) devices 106-1, 106-2, 106-3, and 106-4. In one or more implementations, the Centralized Unit (CU) device 110 is implemented in a cloud computing environment. Each of the sensor processing unit devices 108-1, 108-2, 108-3, and 108-4 obtains (e.g., calculates) load information based on the signals received by the corresponding on of the intelligent sensor devices 104-1, 104-2, 104-3, and 104-4. The sensor processing unit devices 108-1, 108-2, 108-3, and 108-4 provide the load information to the Centralized Unit (CU) device 110, which makes mobility determinations for User Equipment (UE) devices based on the load information.

In general, the CU device 110 can be connected to one or more Distributed Unit (DU) devices, which provide load information to the CU device 110. Distributed Unit (DU) devices that are associated with a signal processing unit device are also connected to the CU device 110. The signal processing unit devices also provide load information to the CU device 110. In one or more embodiments, the CU device 110 configures one or more target frequencies, bands, and/or wireless communication technologies for each of the sensor processing unit devices 108-1, 108-2, 108-3, and 108-4 to use for measuring and reporting load information. The CU device 110 is configured to convert the load information received from each of the Distributed Unit (DU) devices 106-1, 106-2, 106-3, and 106-4 and the load information received from each of the sensor processing unit devices 108-1, 108-2, 108-3, and 108-4 info into perceived user experience parameters. In one or more implementations, the user experience parameter indicates an expected bandwidth value and/or a latency value.

Based on a user experience parameter that is indicative of a perceived user experience, the CU device 110 moves a User Equipment (UE) device to a candidate network device that provides the best user experience, which may be a network device operated by a different MNO that operates the CU device 110. The CU device 110 can also have the capability to incorporate network slice specific functionalities to determine the mobility of users. In one or more implementations, a first network slice having relatively high bandwidth is used for wireless broadband traffic, a second network slice having relatively low latency is used for real-time control traffic, a third network slice having relatively low bandwidth and relatively low latency is used for sensor and Internet of Things (IoT) traffic, and a fourth network slice having relatively extremely high bandwidth is used for video streaming traffic. The CU device 110 can cause the UE device to be connected to a RU device that best supports a particular class of traffic corresponding to a particular network slice.

Figure 2:
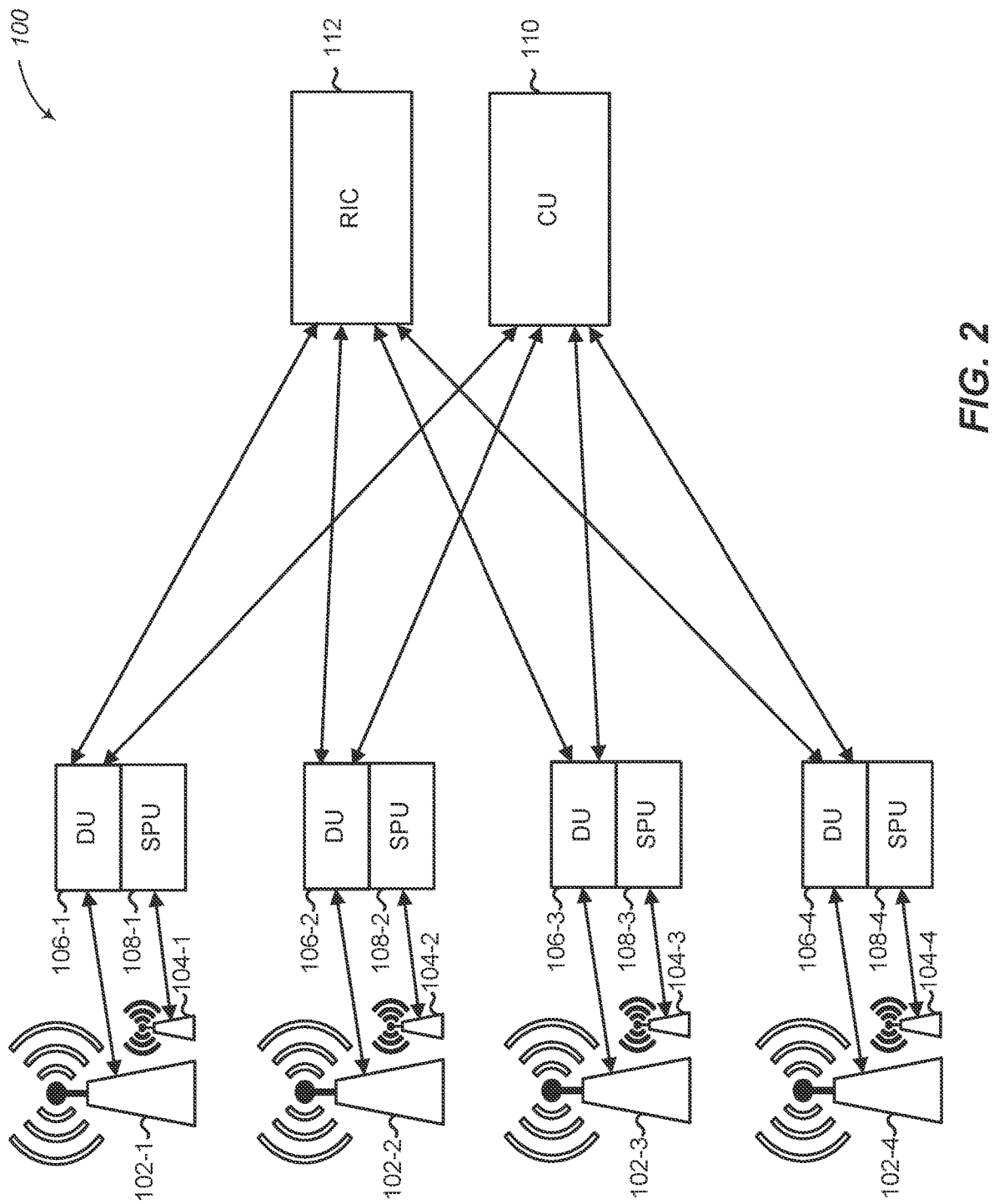
FIG. 2 is a block diagram illustrating another system in accordance with embodiments described herein.

FIG. 2 is a block diagram illustrating another system 100 in accordance with embodiments described herein. The system 100 shown in FIG. 2 is similar in many relevant respects the system 100 shown in FIG. 1, except that the system 100 shown in FIG. 2 also includes a Radio Access Network (RAN) Intelligent Controller (MC) device 112. In one or more implementations, the MC device 112 is implemented in a cloud computing environment.

In general, the MC device 112 can be connected to one or more Distributed Unit (DU) devices and/or Centralized Unit (CU) devices. The MC device 112 can also be connected to sensor processing unit devices, or the MC device 112 can communicate with sensor processing unit devices via corresponding Distributed Unit (DU) devices. The MC device 112 can use historic data, artificial intelligence models, and/or machine learning models for predicting perceived user experiences. Also, the MC device 112 can use historic data, artificial intelligence models, and/or machine learning models for prediction at a per UE level. The MC device 112 is also network slice aware, which enables specific mobility determinations based on Service Level Agreements (SLA) that are associated with each defined network slice.

Figure 3:
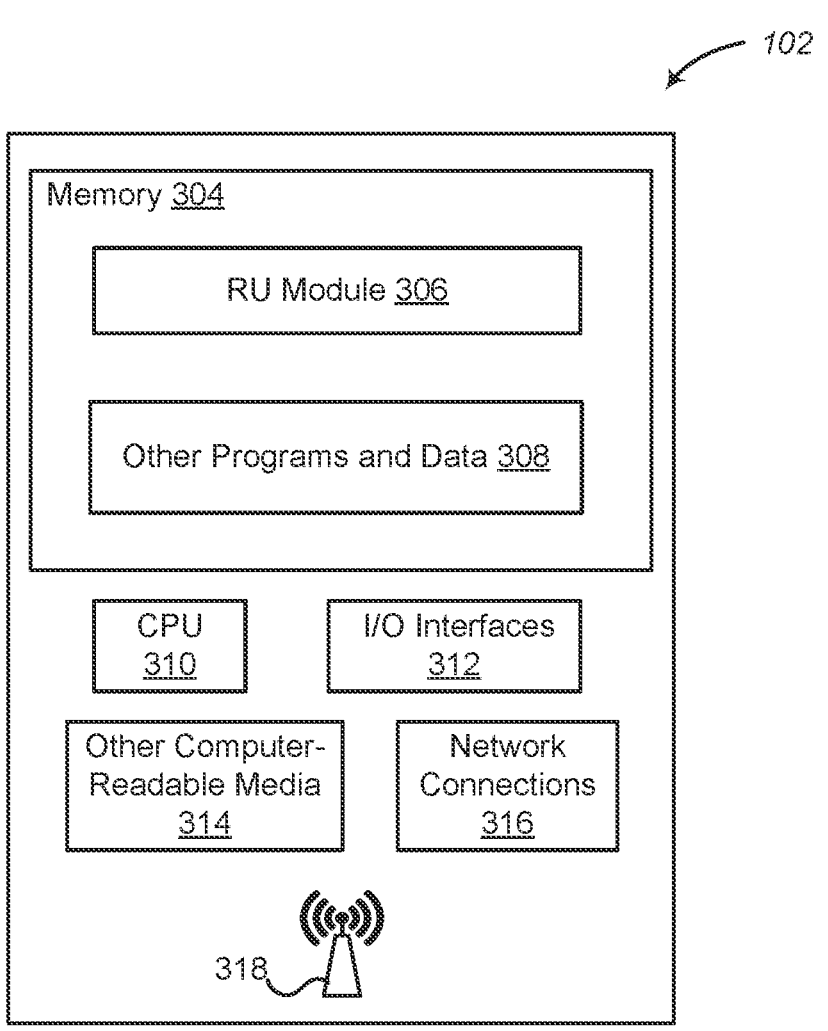
FIG. 3 is a diagram illustrating an example of a Radio Unit (RU) device in accordance with embodiments described herein.

FIG. 3 is a block diagram illustrating an example of a Radio Unit (RU) device 102 in accordance with embodiments described herein. In some embodiments, one or more special-purpose computing systems may be used to implement the RU device 102. Accordingly, various embodiments described herein may be implemented in software, hardware, firmware, or in some combination thereof. The RU device 102 may include one or more memory devices 304, one or more central processing units (CPUs) 310, I/O interfaces 312, other computer-readable media 314, and network connections 316.

The one or more memory devices 304 may include one or more various types of non-volatile and/or volatile storage technologies. Examples of the one or more memory devices 304 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 304 may be utilized to store information, including computer-readable instructions that are utilized by the one or more CPUs 310 to perform actions, including those of embodiments described herein.

The one or more memory devices 304 may have stored thereon a Radio Unit (RU) module 306. The Radio Unit (RU) module 306 is configured to implement and/or perform some or all of the functions of the RU device 102 described herein and interface with radio transceiver 318. The one or more memory devices 304 may also store other programs and data 308, which may include RU digital certificates, connection recovery algorithms, connection recovery rules, network protocols, O-RAN operating rules, user interfaces, operating systems, etc.

Network connections 316 are configured to communicate with other computing devices including a Distributed Unit (DU) device. In various embodiments, the network connections 316 include transmitters and receivers, a layer 2 (L2) switch and physical network ports (not illustrated) to send and receive data as described herein, and to send and receive instructions, commands and data to implement the processes described herein. The L2 switch plays a role as Ethernet forwarding/transparent bridge in order to support Radio Unit (RU) copy and combine function for O-RAN cascade mode. I/O interfaces 312 may include enhanced Common Public Radio Interface (eCPRI) ports, Antenna Interface Standards Group (AISG) interfaces, other data input or output interfaces, or the like. Other computer-readable media 314 may include other types of stationary or removable computer-readable media, such as removable flash drives, external hard drives, or the like.

Figure 4:
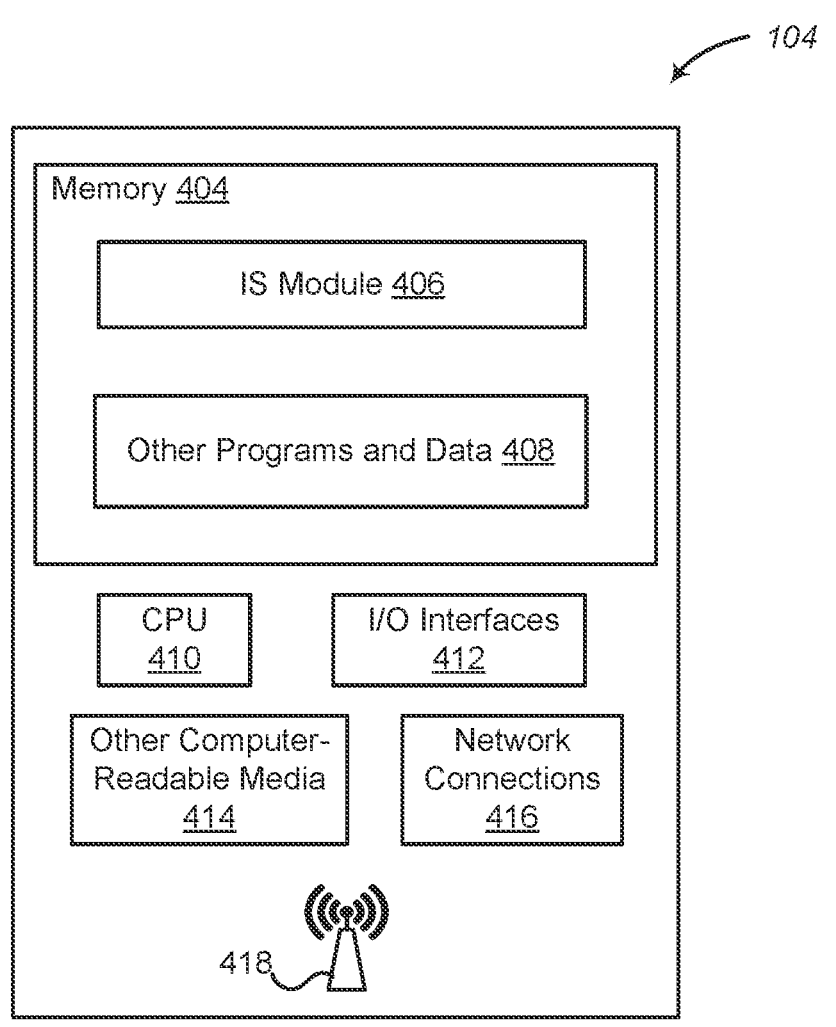
FIG. 4 is a block diagram illustrating an example of an intelligent sensor device in accordance with embodiments described herein.

FIG. 4 is a block diagram illustrating an example of an intelligent sensor device 104 in accordance with embodiments described herein. In some embodiments, one or more special-purpose computing systems may be used to implement the intelligent sensor device 104. Accordingly, various embodiments described herein may be implemented in software, hardware, firmware, or in some combination thereof. The intelligent sensor device 104 may include one or more memory devices 404, one or more central processing units (CPUs) 410, I/O interfaces 412, other computer-readable media 414, and network connections 416.

The one or more memory devices 404 may include one or more various types of non-volatile and/or volatile storage technologies. Examples of the one or more memory devices 404 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 404 may be utilized to store information, including computer-readable instructions that are utilized by the one or more CPUs 410 to perform actions, including those of embodiments described herein.

The one or more memory devices 404 may have stored thereon an intelligent sensor module 406. The intelligent sensor module 406 is configured to implement and/or perform some or all of the functions of the intelligent sensor device 104 described herein and interface with radio transceiver 418. The one or more memory devices 404 may also store other programs and data 408, which may include algorithms for converting a received Radio Frequency (RF) signal to corresponding data in a digital format.

Network connections 416 are configured to communicate a corresponding sensor processing unit device. In various embodiments, the network connections 416 include transmitters and receivers, and physical network ports (not illustrated) to send and receive data as described herein, and to send and receive instructions, commands and data to implement the processes described herein. I/O interfaces 412 may include enhanced Common Public Radio Interface (eCPRI) ports, Antenna Interface Standards Group (AISG) interfaces, other data input or output interfaces, or the like. Other computer-readable media 414 may include other types of stationary or removable computer-readable media, such as removable flash drives, external hard drives, or the like.

Figure 5:
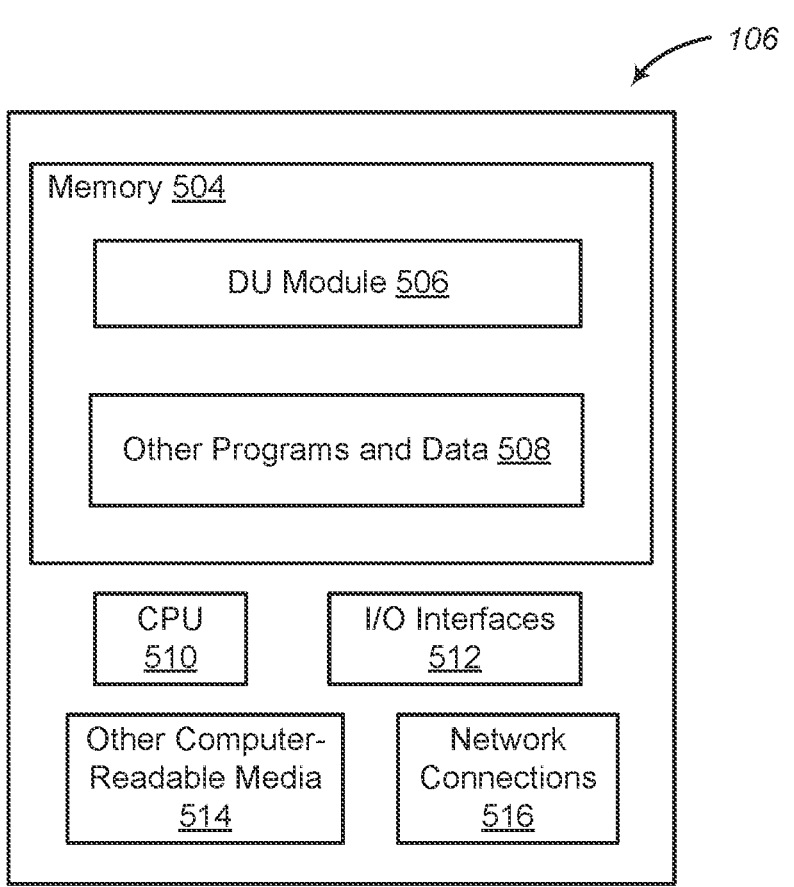
FIG. 5 is a block diagram illustrating an example of a Distributed Unit (DU) device in accordance with embodiments described herein.

FIG. 5 is a block diagram illustrating an example of a Distributed Unit (DU) device 106 in accordance with embodiments described herein. In some embodiments, one or more special-purpose computing systems may be used to implement the Distributed Unit (DU) device 106. Accordingly, various embodiments described herein may be implemented in software, hardware, firmware, or in some combination thereof. The DU device 106 may include one or more memory devices 504, one or more central processing units (CPUs) 510, I/O interfaces 512, other computer-readable media 514, and network connections 516.

The one or more memory devices 504 may include one or more various types of non-volatile and/or volatile storage technologies. Examples of the one or more memory devices 504 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 504 may be utilized to store information, including computer-readable instructions that are utilized by the one or more CPUs 510 to perform actions, including those of embodiments described herein.

The one or more memory devices 504 may have stored thereon a Distributed Unit (DU) module 506. The Distributed Unit (DU) module 506 is configured to implement and/or perform some or all of the functions of the Distributed Unit (DU) 502 described herein. The one or more memory devices 504 may also store other programs and data 508, which may include Fault, Configuration, Accounting, Performance, Security (FCAPS) functions, connection recovery algorithms, connection recovery rules, network protocols, O-RAN operating rules, user interfaces, operating systems, etc. For example, the FCAPS functions include Performance Management (PM), Fault Management (FM), Configuration Management, Certificate Manager (certmgr), and security functions.

Network connections 516 are configured to communicate with other computing devices including one or more Radio Unit (RU) devices, a sensor processing unit device, a Centralized Unit (CU) device, and a RAN Intelligent Controller (RIC) device. In various embodiments, the network connections 516 include transmitters and receivers, a layer 3 (L2) switch and physical network ports (not illustrated) to send and receive data as described herein, and to send and receive instructions, commands and data to implement the processes described herein. The L2 switch plays a role as Ethernet forwarding/transparent bridge in order to support Radio Unit (RU) copy and combine function for O-RAN cascade mode. I/O interfaces 512 may include PCI interfaces, PCI-Express interfaces, other data input or output interfaces, or the like. Other computer-readable media 514 may include other types of stationary or removable computer-readable media, such as removable flash drives, external hard drives, or the like.

Figure 6:
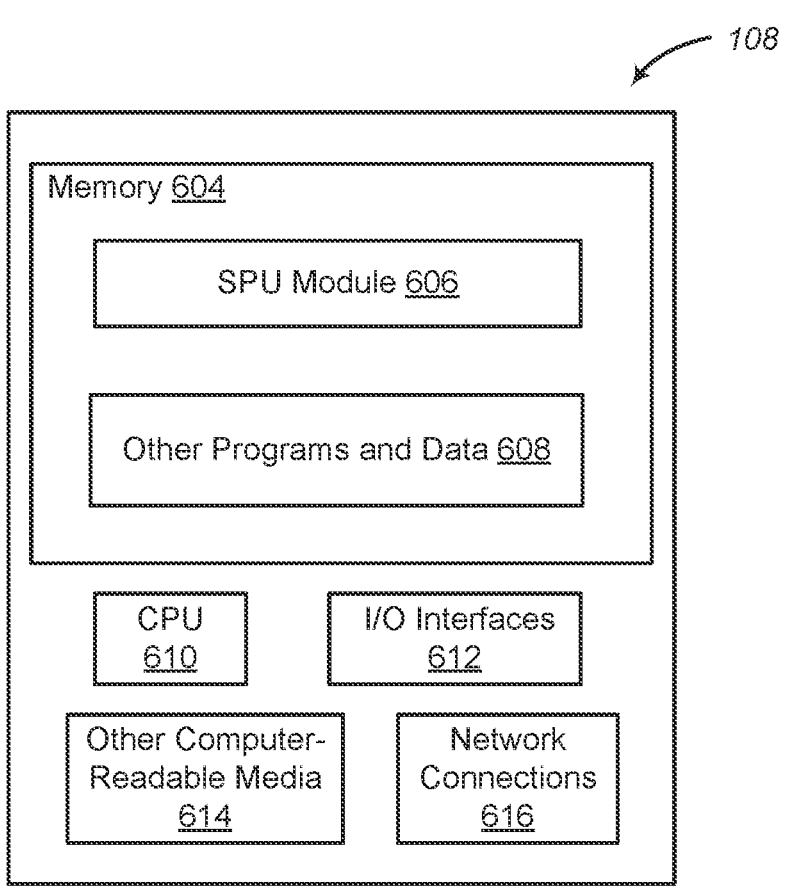
FIG. 6 is a block diagram illustrating an example of a sensor processing unit device in accordance with embodiments described herein.

FIG. 6 is a block diagram illustrating an example of a sensor processing unit device 108 in accordance with embodiments described herein. In some embodiments, one or more special-purpose computing systems may be used to implement the sensor processing unit device 108. Accordingly, various embodiments described herein may be implemented in software, hardware, firmware, or in some combination thereof. The sensor processing unit device 108 may include one or more memory devices 604, one or more central processing units (CPUs) 610, I/O interfaces 612, other computer-readable media 614, and network connections 616.

The one or more memory devices 604 may include one or more various types of non-volatile and/or volatile storage technologies. Examples of the one or more memory devices 604 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 604 may be utilized to store information, including computer-readable instructions that are utilized by the one or more CPUs 610 to perform actions, including those of embodiments described herein.

The one or more memory devices 604 may have stored thereon a sensor processing unit module 606. The sensor processing unit module 606 is configured to implement and/or perform some or all of the functions of sensor processing unit device 108 described herein. The one or more memory devices 604 may also store other programs and data 608, which may include algorithms for processing digital signals received from an intelligent sensor device. For example, the other programs and data 608 may store an algorithm for performing a fast Fourier transform (FFT) that computes a Discrete Fourier transform (DFT) and an Inverse Discrete Fourier transform (IDFT).

Network connections 616 are configured to communicate with other computing devices including a Distributed Unit (DU) device, a Centralized Unit (CU) device, and a RAN Intelligent Controller (MC) device. In various embodiments, the network connections 616 include transmitters and receivers, physical network ports (not illustrated) to send and receive data as described herein, and to send and receive instructions, commands and data to implement the processes described herein. I/O interfaces 612 may include PCI interfaces, PCI-Express interfaces, other data input or output interfaces, or the like. Other computer-readable media 614 may include other types of stationary or removable computer-readable media, such as removable flash drives, external hard drives, or the like.

Figure 7:
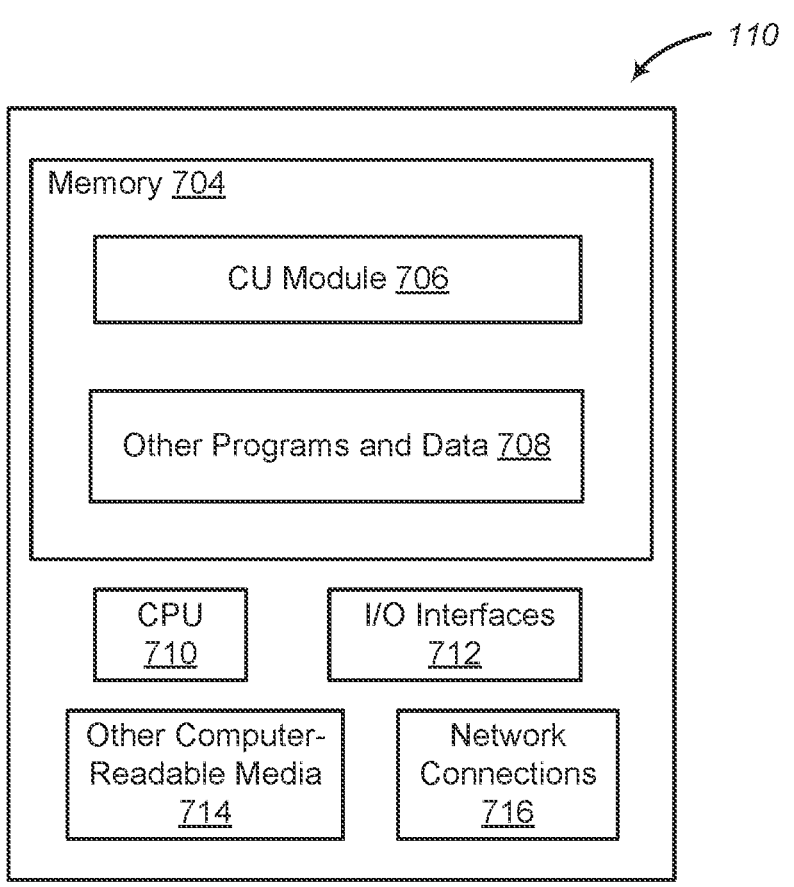
FIG. 7 is a block diagram illustrating an example of a Centralized Unit (CU) device in accordance with embodiments described herein.

FIG. 7 is a block diagram illustrating an example of a Centralized Unit (CU) device 110 in accordance with embodiments described herein. In some embodiments, one or more special-purpose computing systems may be used to implement a Centralized Unit (CU) device 110. Accordingly, various embodiments described herein may be implemented in software, hardware, firmware, or in some combination thereof. The CU device 110 may include one or more memory devices 704, one or more central processing units (CPUs) 710, I/O interfaces 712, other computer-readable media 714, and network connections 716.

The one or more memory devices 704 may include one or more various types of non-volatile and/or volatile storage technologies. Examples of the one or more memory devices 704 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 704 may be utilized to store information, including computer-readable instructions that are utilized by the one or more CPUs 710 to perform actions, including those of embodiments described herein.

The one or more memory devices 704 may have stored thereon a Centralized Unit (CU) module 706. The Centralized Unit (CU) module 706 is configured to implement and/or perform some or all of the functions of the Centralized Unit (CU) device 110 described herein. The one or more memory devices 704 may also store other programs and data 708, which may include programs for database and network communication functions, for example.

In one or more implementations, the CU module 706 includes a plurality of submodules, including a per user experience submodule, a Radio Resource Management (RRM) submodule, a data packet processing submodule, a user mobility submodule, and a slice aware submodule. The per user experience submodule is configured to receive load information from Distributed Unit (DU) devices, receive load information from sensor processing unit devices, determine (e.g., calculate) user experience parameters for each UE being managed by the CU based on the load information, and control DU devices to cause the UE devices to communicate with particular Radio Unit (RU) devices based on the determined user experience parameters. The RRM submodule is configured to manage co-channel interference, radio resources, and radio transmission characteristics, for example, by implementing algorithms for controlling parameters such as transmit power, user allocation, beamforming, data rates, handover criteria, modulation scheme, and error coding scheme, among others. The data packet processing submodule is configured to generate data packets to be transmitted and process received data packets in various formats, such as Transmission Control Protocol/Internet Protocol (TCP/IP) or User Datagram Protocol/Internet Protocol (UPD/IP) packets, for example. The user mobility submodule is configured to perform 5G Mobility Management functions, for example, used to support handover procedures. The slice aware submodule maintains information about each network slice that is configured, including information identifies each network slice and associated information that identifies carrier frequencies and/or network resources (e.g., Physical Resource Blocks (PRBs)) and that describes a service level agreement in terms of a specified network throughput and/or network latency, for example.

Network connections 716 are configured to communicate with other computing devices including sensor processing unit devices, Distributed Unit (DU) devices, RAN Intelligent Controller devices, and a core network. In various embodiments, the network connections 716 include transmitters and receivers, physical network ports (not illustrated) to send and receive data as described herein, and to send and receive instructions, commands and data to implement the processes described herein. I/O interfaces 712 may include PCI interfaces, PCI-Express interfaces, other data input or output interfaces, or the like. Other computer-readable media 714 may include other types of stationary or removable computer-readable media, such as removable flash drives, external hard drives, or the like.

Figure 8:
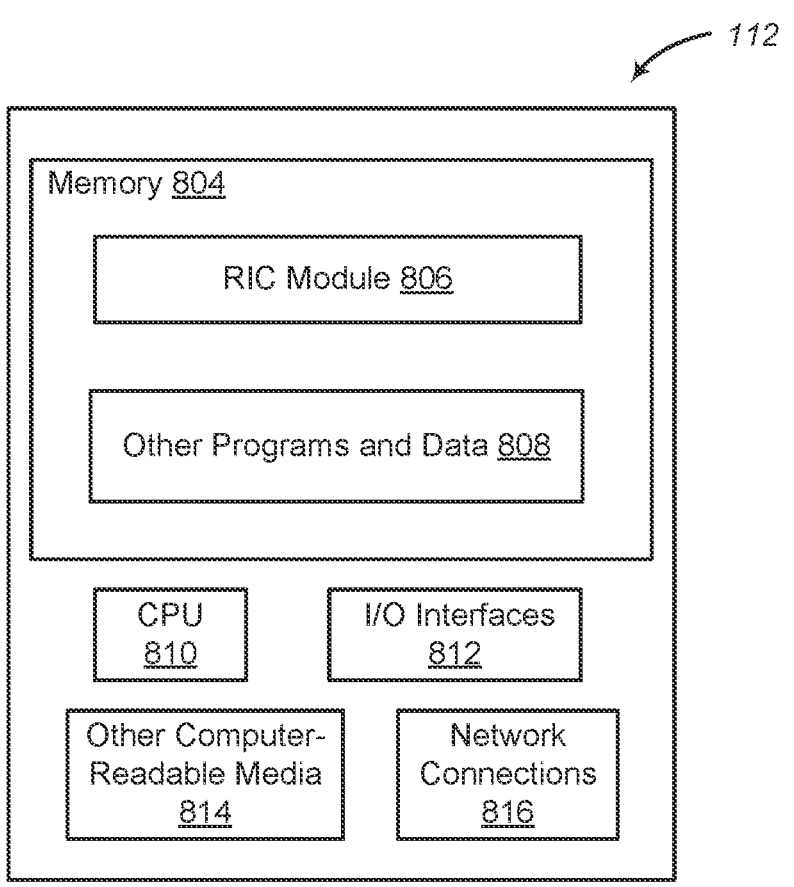
FIG. 8 is a block diagram illustrating an example of a RAN Intelligent Controller (MC) device in accordance with embodiments described herein.

FIG. 8 is a block diagram illustrating an example of a RAN Intelligent Controller (MC) device 112 in accordance with embodiments described herein. In some embodiments, one or more special-purpose computing systems may be used to implement the MC device 112. Accordingly, various embodiments described herein may be implemented in software, hardware, firmware, or in some combination thereof. The CU device 110 may include one or more memory devices 804, one or more central processing units (CPUs) 810, I/O interfaces 812, other computer-readable media 814, and network connections 816.

The one or more memory devices 804 may include one or more various types of non-volatile and/or volatile storage technologies. Examples of the one or more memory devices 804 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 804 may be utilized to store information, including computer-readable instructions that are utilized by the one or more CPUs 810 to perform actions, including those of embodiments described herein.

The one or more memory devices 804 may have stored thereon a RAN Intelligent Controller (MC) module 806. The MC 806 is configured to implement and/or perform some or all of the functions of the MC device 112 described herein, and as described in technical specification from Working Groups 2 and 3 of the Open Radio Access Network (O-RAN) Alliance. The one or more memory devices 804 may also store other programs and data 808, which may include programs for database and network communication functions, for example.

In one or more implementations, the RIC module 806 includes a plurality of submodules, including a per user experience submodule, a user mobility submodule, a slice aware submodule, and an Artificial Intelligence (AI)/Machine Learning (ML) submodule. The per user experience submodule is configured to receive load information from DU devices, receive load information from sensor processing unit devices, determine (e.g., calculate) user experience parameters for each UE being managed by the MC based on the load information, and control DU devices to cause the UE devices to communicate with particular RU devices based on the determined user experience parameters. The user mobility submodule is configured to perform 5G Mobility Management functions, for example, used to support handover procedures. The slice aware submodule maintains information about each network slice that is configured, including information identifies each network slice and associated information that identifies carrier frequencies and/or network resources (e.g., Physical Resource Blocks (PRBs)) and that describes a service level agreement in terms of a specified network throughput and/or network latency, for example. The AI/ML submodule performs processing on the received load information and historical information (e.g., counter values) indicating throughput and latency achieved based on prior routing determinations (e.g. and information indicating whether those prior routing determinations were "good" or "bad") in order to more accurately predict each user experience.

Network connections 816 are configured to communicate with other computing devices including sensor processing unit devices, Distributed Unit (DU) devices, and Centralized Unit (CU) devices. In various embodiments, the network connections 816 include transmitters and receivers, physical network ports (not illustrated) to send and receive data as described herein, and to send and receive instructions, commands and data to implement the processes described herein. I/O interfaces 812 may include PCI interfaces, PCI-Express interfaces, other data input or output interfaces, or the like. Other computer-readable media 814 may include other types of stationary or removable computer-readable media, such as removable flash drives, external hard drives, or the like.

Figure 9A:
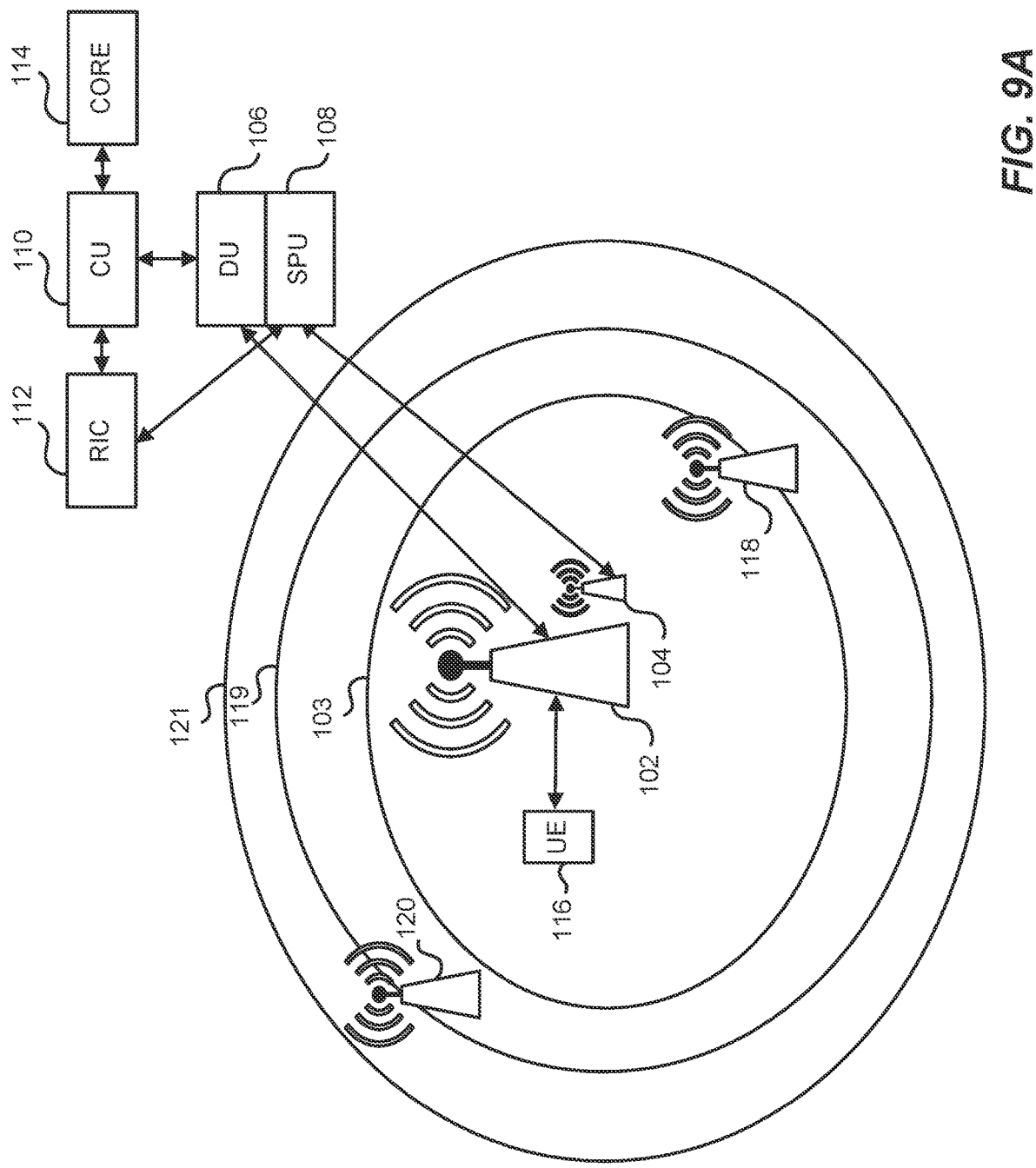
FIGS. 9A to 9D are diagrams for explaining examples of operating a Radio Access Network (RAN) in accordance with embodiments described herein.
Figure 9B:
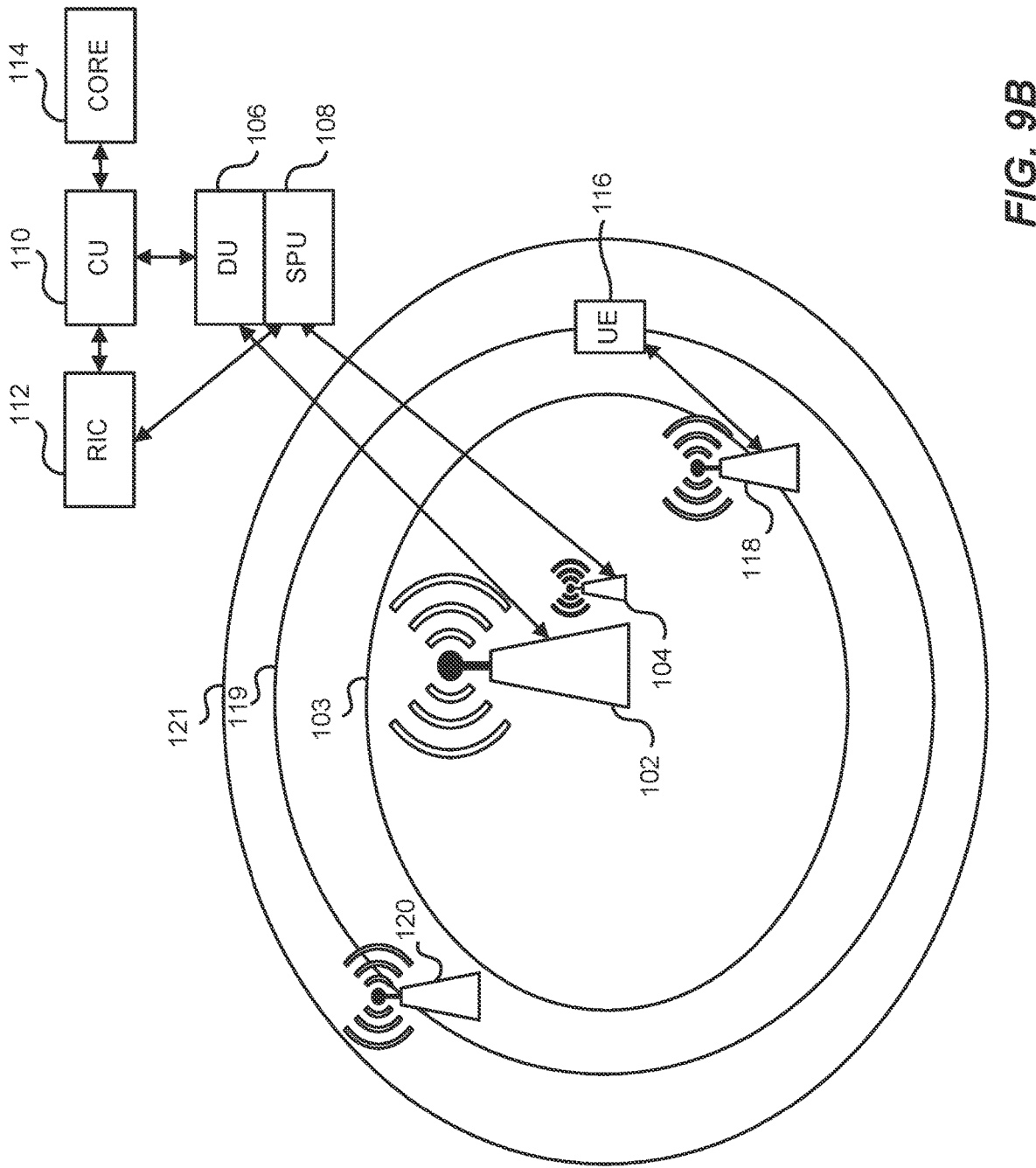
Figure 9C:
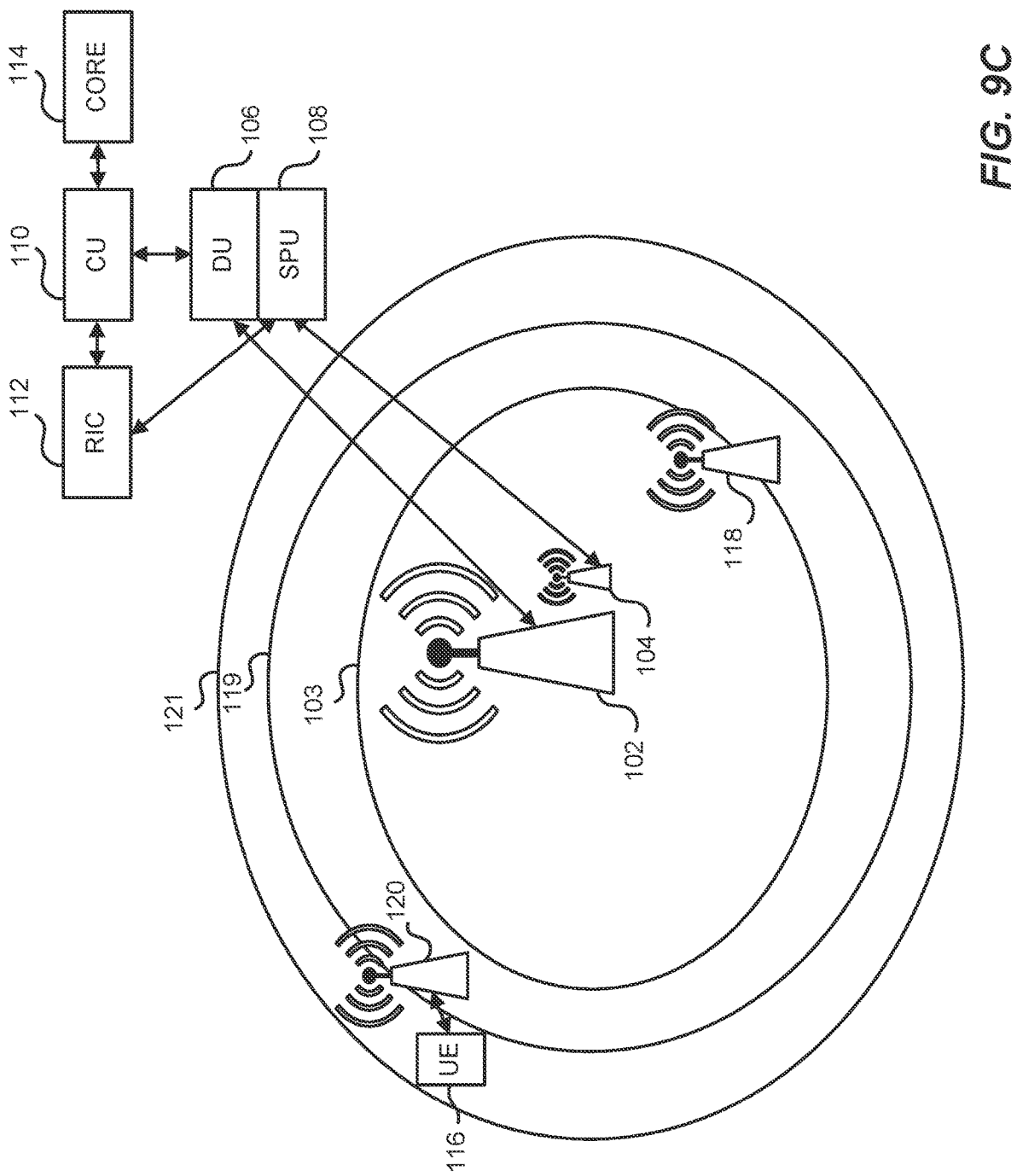
Figure 9D:
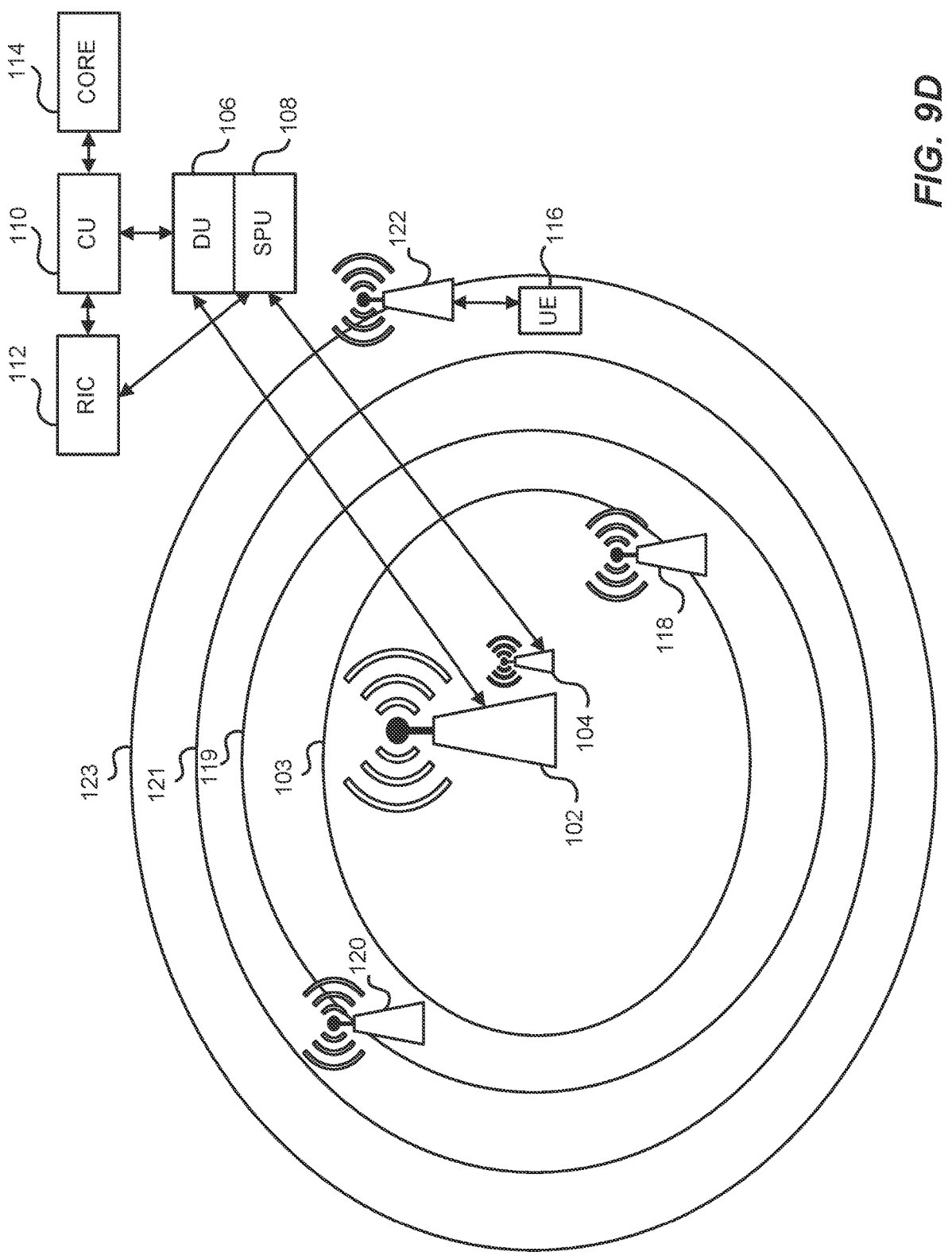

FIGS. 9A to 9D are diagrams for explaining examples of operating a Radio Access Network (RAN) in accordance with embodiments described herein. More particularly, FIG. 9A shows in an initial network state, and FIGS. 9B to 9D show subsequent network states that result from the initial network state shown in FIG. 9A in different circumstances.

FIG. 9A shows a Radio Unit (RU) device 102 that provides cellular network services (e.g., 5G cellular network services) in a coverage area 103. The RU device 102 is operated by a first Mobile Network Operator (MNO). An intelligent sensor device 104 is located in the coverage area 103. The RU device 102 communicates with and is controlled by a Distributed Unit (DU) device 106, which is communicatory coupled to a sensor processing unit device 108. The DU device 106 communicates with and is controlled by a Centralized Unit (CU) device 110, which communicates with a RAN Intelligent Controller (MC) device 112 and a core network 114. The MC device 112 also communicates with and controls the sensor processing unit device 108, which communicates with and controls the intelligent sensor device 104. In the example, of FIG. 9A, the User Equipment (UE) device 116 communicates with and is controlled via the RU device 102.

Other MNOs operate in a vicinity of the RU device 102. More particularly, a RU device 118 that provides cellular network services in a coverage area 119 is located in the vicinity of the RU device 102. The RU device 118 is operated by a second MNO, which is different from the first MNO. Also, a RU device 120 that provides cellular network services in a coverage area 121 is located in the vicinity of the RU device 102. The RU device 120 is operated by a third MNO, which is different from the first MNO and the second MNO.

In the initial network state shown in FIG. 9A, the sensor processing unit device 108 has configured the intelligent sensor 104 to receive a particular set of RF carrier frequencies associated with a plurality of wireless communication technologies (e.g., LTE, NR, and Wi-Fi wireless communication technologies), and to forward digital copies of the received signals to the sensor processing unit device 108. The sensor processing unit device 108 is configured to convert each of the digital copies of the received signals into a corresponding format or waveform of one of the wireless communication technologies, decode the resulting waveform, determine a relative traffic load on each configured carrier frequency for each of the wireless communication technologies, and to transmit information indicating the relative traffic load to the RAN Intelligent Controller (RIC) device 112.

FIG. 9B shows a network state that results from the initial network state shown in FIG. 9A in case where the sensor processing unit device 108 determines, based on the signals received by the intelligent sensor device 104, that there is relatively light loading in the coverage area 119 provided by the RU device 118, compared to the coverage areas 103 and 121 provided by the RU devices 102 and 120, respectively. The sensor processing unit device 108 transmits corresponding load information to the RIC device 112. The RIC device 112 processes the load information received from the sensor processing unit device 108, and determines that a user of the UE device 116 would have a best user experience if the UE device 116 were to be connected to the RU device 118. Accordingly, the RIC device 112 transmits to the CU device 110 a message indicating that a handover is to be performed such that the UE device 116 is to be connected to the RU device 118. In response, the CU device 110 transmits to the DU device 106 a message indicating that the handover is to be performed such that the UE device 116 is to be connected to the RU device 118. In response, the DU device 106 transmits to the UE device 116, via the RU device 102, a message that causes the handover is to be performed such that the UE device 116 is to be connected to the RU device 118.

FIG. 9C shows a network state that results from the initial network state shown in FIG. 9A in case where the sensor processing unit device 108 determines, based on the signals received by the intelligent sensor device 104, that there is relatively light loading in the coverage area 121 provided by the RU device 120, compared to the coverage areas 103 and 119 provided by the RU devices 102 and 118, respectively. The sensor processing unit device 108 transmits corresponding load information to the RIC device 112. The RIC device 112 processes the load information received from the sensor processing unit device 108, and determines that a user of the UE device 116 would have a best user experience if the UE device 116 were to be connected to the RU device 120. Accordingly, the RIC device 112 transmits to the CU device 110 a message indicating that a handover is to be performed such that the UE device 116 is to be connected to the RU device 120. In response, the CU device 110 transmits to the DU device 106 a message indicating that the handover is to be performed such that the UE device 116 is to be connected to the RU device 120. In response, the DU device 106 transmits to the UE device 116, via the RU device 102, a message that causes the handover is to be performed such that the UE device 116 is to be connected to the RU device 120.

FIG. 9D shows a network state that results from the initial network state shown in FIG. 9A in case where the sensor processing unit device 108 determines, based on the signals received by the intelligent sensor device 104, that there is relatively light loading in a coverage area 123 provided by an RU device 122, compared to the coverage areas 103, 119, and 121 provided by the RU devices 102, 118, and 120, respectively. The RU device 122 provides non-3GPP network access (e.g., Wi-Fi network access). The sensor processing unit device 108 transmits corresponding load information to the RIC device 112. The RIC device 112 processes the load information received from the sensor processing unit device 108, and determines that a user of the UE device 116 would have a best user experience if the UE device 116 were to be connected to the RU device 122. Accordingly, the RIC device 112 transmits to the CU device 110 a message indicating that a handover is to be performed such that the UE device 116 is to be connected to the RU device 122. In response, the CU device 110 transmits to the DU device 106 a message indicating that the handover is to be performed such that the UE device 116 is to be connected to the RU device 122. In response, the DU device 106 transmits to the UE device 116, via the RU device 102, a message that causes the handover is to be performed such that the UE device 116 is to be connected to the RU device 122.

Figure 10:
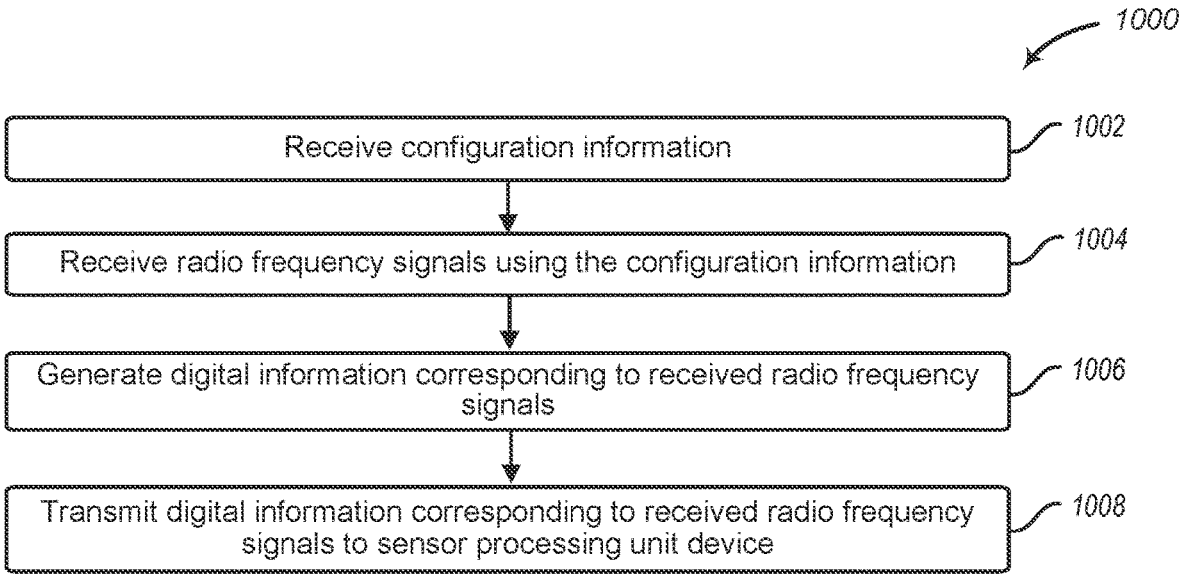
FIG. 10 illustrates a logical flow diagram showing an example of a method of operating an intelligent sensor device in accordance with embodiments described herein.

FIG. 10 illustrates a logical flow diagram showing an example of a method 1000 of operating an intelligent sensor device in accordance with embodiments described herein. The method begins at 1002.

At 1002, the intelligent sensor device receives configuration information. For example, referring to FIG. 9A, intelligent sensor device 104 receives configuration from the sensor processing device 108 at 1002. The configuration information may include numeric values or other identifiers of carrier frequencies to be monitored by the intelligent sensor device 104, and values or other identifiers of channel sizes or bandwidths (e.g., 5 MHz, 10 MHz, 15 MHz, etc). The method 1000 then proceeds to 1004.

At 1004, the intelligent sensor device receives radio frequency (RF) signals using the configuration information. For example, referring to FIG. 9A, the intelligent sensor device 104 receives RF signals from the RU device 102, the UE device 116, and the RU devices 118 and 120 by receiving an RF signal at each carrier frequency indicated by the configuration information at 1004, wherein the bandwidth of each received RF signal is also indicated by the configuration information. By way of another example, because the DU device 106 generates load information for the RU device 102, the sensor processing unit device 108 does not generates load information for the RU device 102 and, thus, the configuration information does not indicate carrier frequencies used by the RU device 102. The method 1000 then proceeds to 1006.

At 1006, the intelligent sensor device generates digital signal information corresponding to the RF signals received at 1004. For example, referring to FIG. 9A, the intelligent sensor device 104 generates digital signal information at 1006 by sampling and quantizing the RF signals received at 1004 using known analog-to-digital conversion technologies. The method 1000 then proceeds to 1008.

At 1008, the intelligent sensor device transmits the digital signal information generated at 1006 to the sensor processing unit device. For example, referring to FIG. 9A, the intelligent sensor device 104 device transmits, at 1008, the digital signal information generated to the sensor processing unit device 108. The method 1000 then ends or returns to 1002 or 1004.

Figure 11:
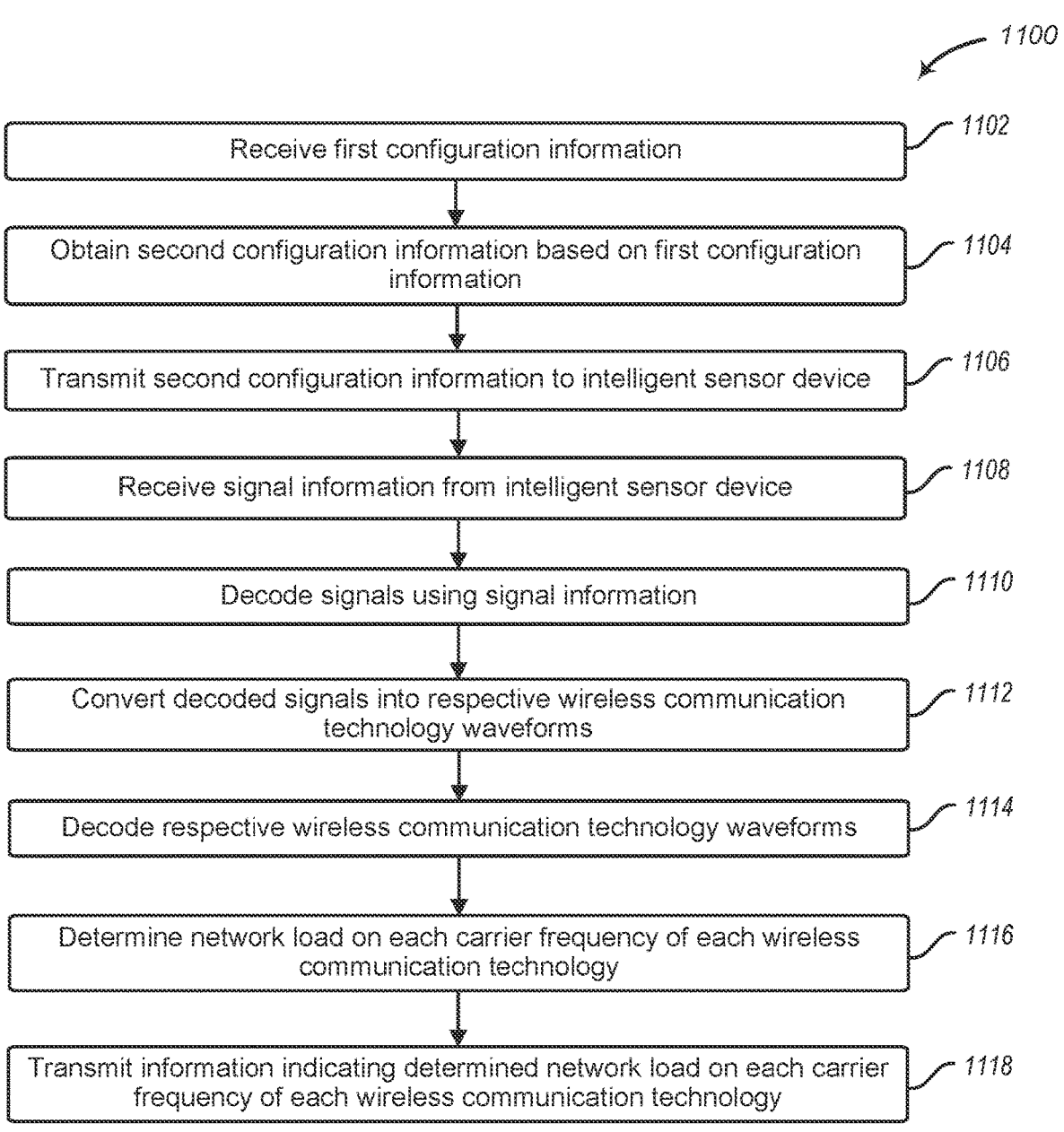
FIG. 11 illustrates a logical flow diagram showing an example of a method of operating a sensor processing unit device in accordance with embodiments described herein.

FIG. 11 illustrates a logical flow diagram showing an example of a method 1100 of operating a sensor processing unit device in accordance with embodiments described herein. The method begins at 1102.

At 1102, the sensor processing unit device receives first configuration information. For example, referring to FIG. 9A, the sensor processing unit device 108 receives first configuration from the RIC device 112. In other examples, the sensor processing unit device 108 receives the first configuration from the DU device 106 or the CU device 110. In one or more embodiments, the first configuration information includes a plurality of sets of configuration information, wherein each set of configuration information is specific to one of a plurality of intelligent sensor devices and includes information that indicates specific carrier frequencies and associated bandwidths that are to be monitored by the intelligent sensor device.

In one or more embodiments, the first configuration information includes a plurality of sets of configuration information, wherein each set of configuration information is specific to one of a plurality of intelligent sensor devices and includes information that indicates specific wireless communication technologies (e.g., LTE, NR, Wi-Fi). The sensor processing unit device 108 stores a table or other suitable data structure for each wireless communication technology that includes information indicating specific carrier frequencies and associated bandwidths that are to be monitored by the intelligent sensor device. The method 1100 then proceeds to 1104.

At 1104, the sensor processing unit device obtains second configuration information based on the first configuration information received at 1102. For example, the first configuration information includes a plurality of sets of configuration information, wherein each set is associated with a unique identifier that identifies one intelligent sensor device, and the sensor processing unit device 108 of obtains the second configuration information by extracting from the first configuration information the set of configuration information associated with the unique identifier that identifies the intelligent sensor device 104. In one or more embodiments, the extracted set of configuration information indicates specific carrier frequencies and associated bandwidths that are to be monitored. In one or more embodiments, the extracted set of configuration information indicates specific wireless communication technologies to be monitored, which the sensor processing unit device 108 uses to obtain specific carrier frequencies and associated bandwidths that are to be monitored, for example, from a table or other suitable data structure for each wireless communication technology that includes information indicating specific carrier frequencies and associated bandwidths that are to be monitored. The method 1100 then proceeds to 1106.

At 1106, the sensor processing unit device transmits the second configuration information obtained at 1104 to an intelligent sensor device. For example, referring to FIG. 9A, the sensor processing unit device 108 transmits the second configuration information to the intelligent sensor device 104 at 1106. The method 1100 then proceeds to 1108.

At 1108, the sensor processing unit device receives signal information from the intelligent sensor device. For example, referring to FIG. 9A, the sensor processing unit device 108 receives the digital signal information at 1108 from the intelligent sensor device 104, which includes an analog-to-digital conversion circuit that generates the digital signal information based on RF signals received by the intelligent sensor device 104. The method 1100 then proceeds to 1110.

At 1110, the sensor processing unit device decodes signals using the signal information received at 1108. For example, referring to FIG. 9A, the sensor processing unit device 108 decodes signals using the signal information received at 1108 using a decoder circuit, which is similar to decoder circuits found in cellular telephones, and which is configured using parameters included in the first configuration information received at 1102. The method 1100 then proceeds to 1112.

At 1112, the sensor processing unit device converts the signals decoded at 1110 into respective wireless communication technology formats or waveforms. For example, referring to FIG. 9A, the sensor processing unit device 108 converts the signals decoded at 1110 into respective LTE, NR, and Wi-Fi waveforms using stored information that defines those waveforms. The method 1100 then proceeds to 1114.

At 1114, the sensor processing unit device decodes the respective wireless communication technology waveforms obtained at 1112. For example, referring to FIG. 9A, the sensor processing unit device 108 decodes the waveforms obtained at 1112 and obtains values included in various Protocol Data Units (PDUs) used in LTE, NR, and Wi-Fi technologies using stored information that defines those PDUs. The method 1100 then proceeds to 1116.

At 1116, the sensor processing unit device determines a load on each carrier frequency of each wireless communication technology. For example, referring to FIG. 9A, the sensor processing unit device 108 determines a network load on each carrier frequency used in LTE, NR, and Wi-Fi technologies by determining the number of bits per second in each signal transmitted on each carrier used in LTE, NR, and Wi-Fi technologies and comparing the determined number of bits per second with stored information indicating a maximum network throughput. For example, if the sensor processing unit device 108 determines that 10 Mbps are transmitted on a particular carrier frequency, and the stored information indicates that the maximum throughput on that particular carrier frequency is 100 Mbs, the sensor processing unit device 108 determines that the network load on that particular carrier frequency is 10 Mbps/100 Mbs or 0.1. The method 1100 then proceeds to 1118.

At 1118, the sensor processing unit device transmits information indicating the determined network load on each carrier frequency of each wireless communication technology determined at 1116. For example, referring to FIG. 9A, the sensor processing unit device 108 transmits, at 1118, information indicating the determined network load on each carrier frequency of each wireless communication technology to the RIC device 112. The method 1100 then ends or returns to 1102 or 1108.

FIG. 12 illustrates a logical flow diagram showing an example of a method of operating a RAN Intelligent Controller (MC) device in accordance with embodiments described herein. The method begins at 1202.

At 1202, the MC device obtains configuration information. For example, referring to FIG. 9A, the MC device 112 generates configuration information that is used to configure the intelligent sensor device 104 and the sensor processing unit device 108, wherein the configuration information includes information that indicates a plurality of carrier frequencies and associated bandwidths to be monitored by the intelligent sensor device 104, and one or more wireless network communication technologies for which load information is to be calculated by the sensor processing unit device 108. In one or more implementations, the configuration information includes a unique identifier (e.g., network address) of each device (e.g., intelligent sensor device 104 and/or sensor processing unit device 108) to which configuration information pertains. In one or more implementations, the MC device 112 receives the configuration information from an external device. The method 1200 then proceeds to 1204.

At 1204, the MC device transmits the configuration information obtained at 1202 to a sensor processing unit device. For example, referring to FIG. 9A, the MC device 112 transmits the configuration information obtained at 1202 to the sensor processing unit device 108 at 1204. The method 1200 then proceeds to 1206.

At 1206, the RIC device receives load information from the sensor processing unit device. For example, referring to FIG. 9A, the RIC device 112 receives load information from the sensor processing unit device 108 at 1204, wherein the load information includes information indicating a load on each carrier frequency identified by the configuration obtained at 1202, for each wireless communication technology identified by the configuration obtained at 1202. In one or more implementations, the load information includes timestamp information indicating a day and time when the load information was calculated, for example. The method 1200 then proceeds to 1208.

At 1208, the RIC device determines at least one user experience parameter for a user of a UE device based on the load information received from the sensor processing unit device 108 at 1206. For example, referring to FIG. 9A, the RIC device 112 determines three potential user experience parameters for a user of the UE device 116 based on the load information received from the at 1206. More particularly, the RIC device 112 determines a first potential user experience parameter (e.g., expected bandwidth) that would result if the UE device 116 were to remain connected to the RU device 102, a second potential user experience parameter (e.g., expected bandwidth) that would result if the UE device 116 were to be connected to the RU device 118, and a third potential user experience parameter (e.g., expected bandwidth) that would result if the UE device 116 were to be connected to the RU device 120. The RIC device 112 then determines which of the potential user experiences would result in a best user experience for the user of the UE device 116. The RIC device 112 may use different criteria to determine the best user experience for the user of the UE device 116, including maximum throughput and minimum latency, for example. In one or more embodiments, the RIC device 112 uses network slice information to determine the best user experience for the user of the UE device 116, wherein the RIC device 112 determines that the best user experience for the user of the UE device 116 is one that would satisfy a particular service level agreement associated with a particular network slice used by the UE device 116. Accordingly, the RIC device 112 may determine that the UE device 116 is to be connected to a first RU device, even if a second RU device is associated with a lowest network load, if the RIC device 122 determines that connection to the second RU device would not result in a SLA for a particular network slice being met and connection to the first RU device would result in the SLA for the particular network slice being met.

In one or more embodiments, the MC device 112 receives load information from a plurality of sensor processing device and stores that information for subsequent analysis. In addition, the RIC device 112 receives performance information that indicates an actual performance parameter (e.g., indicating bandwidth, throughput, or latency) that resulted from previous determinations of best user experiences. The RIC device 112 analyzes (e.g., using artificial intelligence or machine learning techniques) the load information and the performance information to improve models used by the RIC device 112 to determine the best user experience for users under a variety of conditions. The method 1200 then proceeds to 1210.

At 1210, the RIC device selects a radio unit device based on the at least one user experience parameter determined at 1208. For example, referring to FIG. 9A, if the RIC device 112 determines that the best user experience for the user of the UE device 116 would result if the UE device 116 were to be connected to the RU device 118, the RIC device 112 selects the RU device 118. The method 1200 then proceeds to 1212.

At 1212, the RIC device transmits a message including an identifier of the radio unit device selected at 1210. For example, referring to FIG. 9A, if the RIC device 112 selects the RU device 118 at 1210, the RIC device 112 transmits a message that includes an identifier (e.g., network address) of the RU device 118 at 1212. In one or more embodiments, the message is configured according to 3GPP TS 38.331 V15.4.0. For example, RIC device 112 transmits the message to the CU device 110 at 1212, wherein the CU device 110 transmits a corresponding message to the DU device 106 that causes the DU device 106 to initiate a handover procedure that results in the UE device being handed over the RU device 118. The method 1200 then ends or returns to 1202 or 1206.

The various embodiments described above can be combined to provide further embodiments. For example, although the method 1200 shown in FIG. 12 is described as being performed by a RIC device, the method 1200 could be performed by a CU device or an Orchestrator device.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method performed by a sensor processing unit device of a cellular telecommunication network, the method comprising: receiving, by the sensor processing unit device, configuration information that identifies a plurality of carrier frequency bands, each carrier frequency band is associated with a separate wireless communication technology; transmitting, by the sensor processing unit device, the configuration information from the sensor processing unit device to an intelligent sensor device; receiving, by the sensor processing unit device, signal information from the intelligent sensor device, the signal information corresponding to digital copies of radio frequency signals captured by the intelligent sensor device at the plurality of carrier frequency bands identified by the configuration information; decoding, by the sensor processing unit device, the digital copies of the radio frequency signals based on the separate wireless communication technology associated with the carrier frequency band of the radio frequency signals; determining, by the sensor processing unit device, a network load on each of the plurality of carrier frequency bands identified by the configuration information based on the decoded radio frequency signals; and transmitting, by the sensor processing unit device, information indicating the network load on each of the plurality of carrier frequency bands identified by the configuration information.

2. The method of claim 1 wherein: the receiving configuration information includes receiving the configuration information from a RAN Intelligent Controller (RIC) device; and the transmitting information indicating the network load includes transmitting the information indicating the network load to the RIC device.

3. The method of claim 1 wherein: the receiving configuration information includes receiving the configuration information from a Centralized Unit (CU) device of the cellular telecommunication network; and the transmitting information indicating the network load includes transmitting the information indicating the network load to the CU device.

4. The method of claim 1 wherein decoding the digital copies of the radio frequency signals comprises: converting, by the sensor processing unit device, the digital copies of the radio frequency signals into a-waveforms corresponding to the separate wireless communication technology associated with the carrier frequency band of the radio frequency signals; and decoding, by the sensor processing unit device, the waveforms corresponding to the separate wireless communication technology associated with the carrier frequency band of the radio frequency signals.

5. The method of claim 4 wherein: the separate wireless communication technology associated with the plurality of carrier frequency bands includes is a Long Term Evolution (LTE) wireless communication technology, a 5G NR wireless communication technology, and a Wi-Fi wireless communication technology.

6. The method of claim 1 wherein: the sensor processing unit device is operated by a first mobile network operator (MNO), and the plurality of carrier frequencies identified by the configuration information includes at least one carrier frequency used by a second MNO that is different from the first MNO.

7. The method of claim 1 wherein: the sensor processing unit device is operated by a first mobile network operator (MNO), and the plurality of carrier frequencies identified by the configuration information are not used by the first MNO.

8. A method of operating a fifth-generation New Radio (5G NR) cellular telecommunication network radio access network (RAN), the method comprising: transmitting, by a processing device of the cellular telecommunication network RAN, configuration information that identifies a plurality of carrier frequency bands to a sensor processing unit device; receiving, by the processing device, information indicating a network load on each of the plurality of carrier frequency bands identified by the configuration information from the sensor processing unit device, wherein the network load on each of the plurality of carrier frequency bands identified by the configuration information is based on radio frequency signals captured by a radio transceiver of an intelligent sensor device; determining, by the processing device, at least one user experience parameter based on the information indicating the network load on each of the plurality of carrier frequency bands identified by the configuration information; selecting, by the processing device, a radio unit device based on the at least one user experience parameter; and transmitting, by the sensor processing unit device, a message including information that identifies the radio unit device.

9. The method of claim 8 wherein: the processing device is a RAN Intelligent Controller (RIC) device.

10. The method of claim 8 wherein: the processing device is a Centralized Unit (CU) device.

11. The method of claim 8 wherein: the message is configured to cause a handover of a User Equipment (UE) device to the radio unit device.

12. The method of claim 8 wherein: the configuration information includes information that identifies a separate one or more wireless communication technology for each of the plurality of carrier frequency bands technologies.

13. The method of claim 12 wherein: the separate wireless communication technology for each of the plurality of carrier frequency bands include a Long Term Evolution (LTE) wireless communication technology, a 5G NR wireless communication technology, or and a Wi-Fi wireless communication technology.

14. The method of claim 8 wherein: the processing device is operated by a first mobile network operator (MNO), and the one or more carrier frequencies identified by the configuration information includes at least one carrier frequency used by a second MNO that is different from the first MNO.

* * * * *